(12) United States Patent
Hayakawa et al.

(10) Patent No.: US 10,093,307 B2
(45) Date of Patent: Oct. 9, 2018

(54) AUTOMOBILE INCLUDING MOTOR FOR RUNNING THE AUTOMOBILE

(71) Applicant: TOYOTA JIDOSHA KABUSHIKI KAISHA, Toyota-shi, Aichi-ken (JP)

(72) Inventors: Yuki Hayakawa, Okazaki (JP); Masaya Amano, Toyota (JP); Takashi Ando, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 44 days.

(21) Appl. No.: 15/520,550

(22) PCT Filed: Sep. 28, 2015

(86) PCT No.: PCT/IB2015/001698
§ 371 (c)(1),
(2) Date: Apr. 20, 2017

(87) PCT Pub. No.: WO2016/063116
PCT Pub. Date: Apr. 28, 2016

(65) Prior Publication Data
US 2018/0009434 A1  Jan. 11, 2018

(30) Foreign Application Priority Data
Oct. 24, 2014 (JP) .................... 2014-217057

(51) Int. Cl.
*B60W 20/50* (2016.01)
*B60K 6/445* (2007.10)
(Continued)

(52) U.S. Cl.
CPC ............. *B60W 20/50* (2013.01); *B60K 6/365* (2013.01); *B60K 6/445* (2013.01); *B60K 6/46* (2013.01); *B60W 10/06* (2013.01); *B60W 10/08* (2013.01); *B60W 50/029* (2013.01); *B60W 2050/0006* (2013.01); *B60W 2050/0292* (2013.01); *B60W 2510/0638* (2013.01); *B60W 2510/0657* (2013.01); *B60W 2510/081* (2013.01); *B60W 2510/083* (2013.01); *B60W 2510/244* (2013.01); *B60W 2520/10* (2013.01); *B60W 2540/10* (2013.01); *B60W 2540/12* (2013.01);
(Continued)

(58) Field of Classification Search
CPC ...... B60W 20/50; B60W 10/06; B60W 10/08; B60W 50/029
See application file for complete search history.

(56) References Cited

U.S. PATENT DOCUMENTS

| | | | |
|---|---|---|---|
| 2001/0041955 A1 | 11/2001 | Nada | |
| 2013/0038342 A1* | 2/2013 | Nozaki | B60L 3/0038 324/750.3 |
| 2015/0025728 A1* | 1/2015 | Hase | B60K 6/445 701/22 |

FOREIGN PATENT DOCUMENTS

| | | |
|---|---|---|
| EP | 1153783 A2 | 11/2001 |
| JP | 2001-317399 A | 11/2001 |
| JP | 2013-165564 A | 8/2013 |

* cited by examiner

*Primary Examiner* — Calvin Cheung
(74) *Attorney, Agent, or Firm* — Oliff PLC

(57) ABSTRACT

When there is an abnormality in communications between a motor ECU and an HVECU in an automobile, the motor ECU controls a motor such that creep torque or a given torque larger than the creep torque is delivered from the motor. Thus, when there is an abnormality in communications between the HVECU and the motor ECU, the automobile is able to run in a limp home mode.

5 Claims, 6 Drawing Sheets

(51) Int. Cl.
*B60W 50/029* (2012.01)
*B60W 10/06* (2006.01)
*B60W 10/08* (2006.01)
*B60K 6/365* (2007.10)
*B60K 6/46* (2007.10)
*B60W 50/00* (2006.01)

(52) U.S. Cl.
CPC ............... *B60W 2710/0644* (2013.01); *B60W 2710/0666* (2013.01); *B60W 2710/081* (2013.01); *B60W 2710/083* (2013.01); *B60W 2710/244* (2013.01); *Y02T 10/6239* (2013.01); *Y02T 10/6286* (2013.01); *Y02T 10/7258* (2013.01); *Y10S 903/91* (2013.01); *Y10S 903/93* (2013.01)

AUTOMOBILE INCLUDING MOTOR FOR RUNNING THE AUTOMOBILE

BACKGROUND OF THE INVENTION

1. Field of the Invention

The invention relates to an automobile including a motor for running the automobile, and more particularly to an automobile including the motor for running the automobile, a battery that supplies and receives electric power to and from the motor, a main controller that sets a torque command of the motor according to an accelerator operation amount, and a motor controller that receives the torque command from the main controller, and controls the motor so as to drive the motor according to the torque command thus received.

2. Description of Related Art

As one example of this type of automobile, an automobile including a motor for running the automobile, an inverter that drives the motor, a battery, a relay that connects or disconnects the inverter to or from the battery, an electronic control unit for hybrid vehicle (HVECU) that controls the relay, and an electronic control unit for motor (motor ECU) that controls the inverter has been proposed (see Japanese Patent Application Publication No. 2013-165564 A (JP 2013-165564 A), for example). In this automobile, in order to prevent any inconvenience or problem from arising due to noise, etc. of a drive system including the motor and the inverter, the motor ECU writes information on the drive system into a non-volatile memory incorporated in the ECU, under a condition that the motor ECU receives information that the relay is OFF from the HVECU. In this automobile, when there is an abnormality in communications between the HVECU and the motor ECU, the HVECU performs gate blocking in the inverter, and switches off the relay when the vehicle speed is low. Also, when there is an abnormality in communications between the motor ECU and the HVECU, the motor ECU writes information on the drive system into the non-volatile memory, under a condition that a voltage measured at a location closer to the inverter than the relay is lower than the lower-limit voltage of a normal range of the battery. In this manner, the motor ECU can write the information on the drive system into the non-volatile memory, even when there is an abnormality in communications between the motor ECU and the HVECU.

In the automobile as described above, when an abnormality arises in communications between the HVECU and the motor ECU, during running, the HVECU performs gate blocking in the inverter, and therefore, the motor (inverter) cannot be controlled by the motor ECU. As a result, torque for running the automobile cannot be delivered from the motor.

SUMMARY OF THE INVENTION

In view of the above problem, this invention provide an automobile which includes a motor for running the automobile, a main controller that sets a torque command of the motor according to accelerator operation, and a motor controller that receives the torque command from the main controller and controls the motor so as to drive the motor according to the torque command, and which is able to run even when there is an abnormality in communications between the main controller and the motor controller.

According to one aspect of the invention, an automobile, which includes a motor, a battery, a main controller, and a motor controller, is provided. The motor is configured to run the automobile. The battery is configured to deliver and receive electric power to and from the motor. The main controller is configured to set a first torque command of the motor according to an accelerator operation amount of the automobile. The motor controller is configured to (i) communicate with the main controller, (ii) receive the first torque command from the main controller, (iii) control the motor so as to drive the motor according to the first torque command received, and (iv) control the motor so as to drive the motor according to a second torque command when there is an abnormality in communications between the motor controller and the main controller.

In the automobile of this invention, when there is an abnormality in communications between the main controller and the motor controller, the motor controller controls the motor so as to drive the motor according to a first torque command. Thus, when there is the abnormality in communications between the main controller and the motor controller, the automobile is able to run with torque (power) delivered from the motor. Accordingly, the automobile is able to run in a limp home mode. The torque of the first torque command may be set to, for example, creep torque.

In the automobile of the invention as described above, when there is the abnormality in communications between the motor controller and the main controller, the motor controller may be configured to (i) control the motor so as to drive the motor according to the second torque command, when the accelerator operation amount is smaller than a first threshold value, and (ii) control the motor so as to drive the motor according to a third torque command that is larger than the second torque command, when the accelerator operation amount is equal to or larger than the first threshold value. With this arrangement, the automobile is able to run with torque determined depending on whether the accelerator operation amount is equal to or larger than the first threshold value. Accordingly, the automobile is able to run in a limp home mode, for example, and the running performance in the limp home mode can be improved.

The automobile of this invention may further include an engine, a generator, and a planetary gear unit. The generator may be configured to (i) deliver and receive power, and (ii) deliver and receive electric power to and from the battery. The planetary gear unit may include three rotating elements connected to a rotary shaft of the generator, an output shaft of the engine, and a drive shaft coupled to an axle, and the three rotating elements may be arranged in the order of the rotary shaft, the output shaft, and the drive shaft in a nomographic chart. The motor may be configured to deliver and receive power to and from the drive shaft. The main controller may be configured to (i) set a target operating point of the engine according to the accelerator operation amount, (ii) set a fourth torque command of the motor, (iii) control the engine so as to operate the engine at the target operating point, and (iv) control the engine so as to rotate the engine at a predetermined rotational speed when there is the abnormality in communications between the main controller and the motor controller. When there is the abnormality in communications between the motor controller and the main controller, the motor controller may be configured to (i) control the motor so as to drive the motor according to a fifth torque command when the accelerator operation amount is smaller than a second threshold value, and (ii) control the motor so as to drive the motor according to a sixth torque command that is equal to or larger than the fifth torque command, and control the generator so as to drive the generator according to a seventh torque command in such a direction as to hold down a rotational speed of the engine, when the accelerator operation amount is equal to or larger than the second threshold value. Here, the torque delivered from the generator in such a direction as to hold down the rotational speed of the engine is applied, as torque for running the automobile forward, to the drive shaft via the planetary gear unit. Accordingly, with this control, the automobile is able to run with torque determined depending on whether the accelerator operation amount is equal to or larger than the threshold value, or smaller than the threshold value. Accordingly, the automobile is able to run in a limp home mode, and the running performance in the limp home mode can be improved.

In the automobile further including the engine, generator, and the planetary gear unit as described above, when there is the abnormality in communications between the motor controller and the main controller, the motor controller may be configured to (i) control the motor so as to drive the motor according to the sixth torque command, when the accelerator operation amount is equal to or larger than the second threshold value, and a power storage ratio of the battery is equal to or larger than a third threshold value, (ii) control the generator so as to drive the generator according to the seventh torque command, and (iii) control the motor so as to drive the motor according to an eighth torque command that is equal to or larger than the fifth torque command and smaller than the sixth torque command, and control the generator so as to drive the generator according to a ninth torque command that is larger than the seventh torque command in such a direction as to hold down the rotational speed of the engine, when the power storage ratio of the battery is smaller than the third threshold value. With this arrangement, when the power storage ratio of the battery is smaller than the third threshold value, electric power consumed by the motor is reduced, and electric power generated by the generator is increased, as compared with the case where the power storage ratio of the battery is equal to or larger than the third threshold value. Therefore, the power storage ratio of the battery can be made less likely or unlikely to be reduced, and the distance the automobile is able to run can be increased.

In the automobile as described above, when there is the abnormality in communications between the main controller and the motor controller, the main controller may be configured to (i) control the engine so as to rotate the engine at the first predetermined rotational speed when the accelerator operation amount is smaller than the second threshold value, (ii) control the engine so as to rotate the engine at a second predetermined rotational speed that is different from the first predetermined rotational speed, when the accelerator operation amount is equal to or larger than the second threshold value, and the power storage ratio of the battery is equal to or larger than the third threshold value, and (iii) control the engine so as to rotate the engine at a third predetermined rotational speed that is different from the first predetermined rotational speed and the second predetermined rotational speed, when the accelerator operation amount is equal to or larger than the second threshold value, and the power storage ratio of the battery is smaller than the third threshold value. When there is the abnormality in communications between the motor controller and the main controller, the motor controller may be configured to (i) calculate an estimated rotational speed of the engine using a rotational speed of the motor and a rotational speed of the generator, when there is the abnormality in communications between the motor controller and the main controller, and (ii) determine, using the estimated rotational speed, whether the accelerator operation amount is smaller than the second threshold value, and whether the power storage ratio of the battery is equal to or larger than the third threshold value, or smaller than the third threshold value, when the accelerator operation amount is equal to or larger than the second threshold value. With this arrangement, the motor controller can determine, by a simple method, whether the accelerator operation amount is equal to or larger than the threshold value, or smaller than the threshold value, and whether the power storage ratio of the battery is equal to or larger than the third threshold value, or smaller than the third threshold value, when the accelerator operation amount is equal to or larger than the threshold value. In this case, the third predetermined rotational speed may be made higher than the second predetermined rotational speed. As a result, when the power storage ratio of the battery is smaller than the third threshold value, electric power generated by the generator can be further increased, and the power storage ratio of the battery can be made further less likely or unlikely to be reduced.

In the automobile as described above, when there is the abnormality in communications between the main controller and the motor controller, the main controller may be configured to (i) control the engine so as to rotate the engine at the first predetermined rotational speed, when the accelerator operation amount is smaller than the second threshold value, and (ii) control the engine so as to rotate the engine at a fourth predetermined rotational speed that is different from the first predetermined rotational speed, when the accelerator operation amount is equal to or larger than the second threshold value. When there is the abnormality in communications between the motor controller and the main controller, the motor controller may be configured to (i) calculate an estimated rotational speed of the engine using a rotational speed of the motor and a rotational speed of the generator, and (ii) determine whether the accelerator operation amount is equal to or larger than the second threshold value, or smaller than the second threshold value, using the estimated rotational speed of the engine. With this arrangement, the motor controller can determine whether the accelerator operation amount is equal to or larger than the second threshold value, or smaller than the second threshold value, by a simple method. In this case, the fourth predetermined rotational speed may be made higher than the first predetermined rotational speed. As a result, when the accelerator operation amount is relatively large, the rotational speed of the engine is made higher as compared with the time when the accelerator operation amount is relatively small. Therefore, as compared with the case where the fourth predetermined rotational speed is made smaller than the first predetermined rotational speed, the driver is less likely or unlikely to feel strange or uncomfortable.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One embodiment of the invention will be described.

Figure 1:
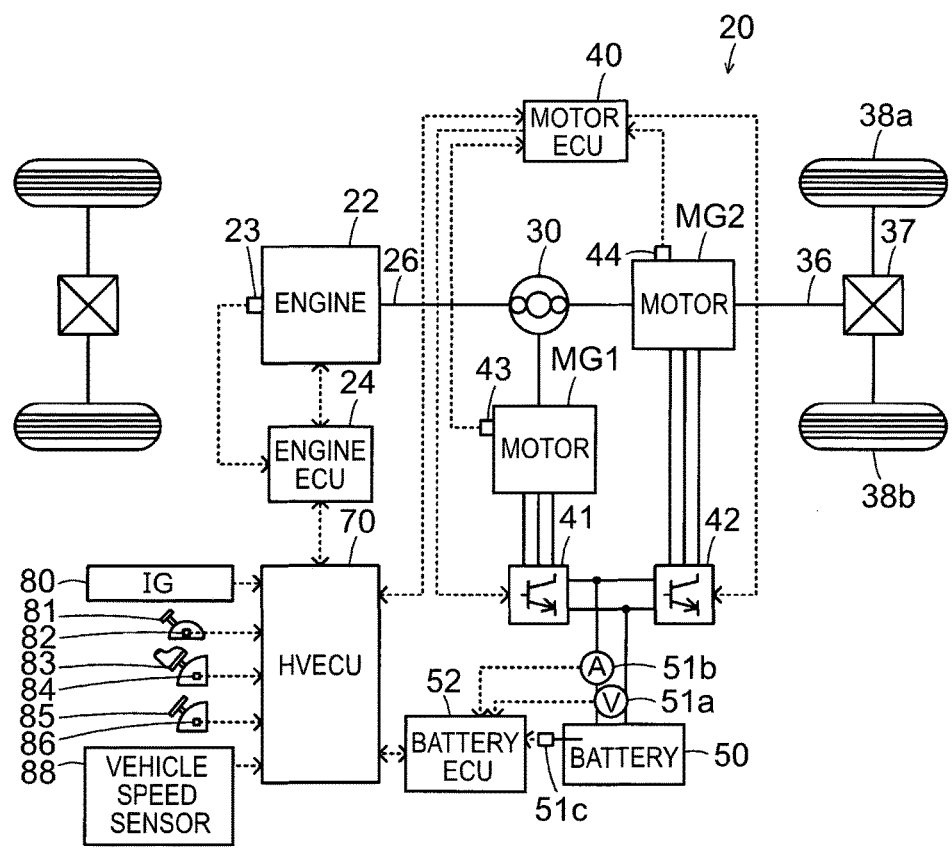
FIG. 1 is a view showing the general configuration of an automobile including a motor for running the automobile according to one embodiment of the invention.

FIG. 1 shows the general configuration of a hybrid vehicle 20 as one embodiment of the invention. As shown in FIG. 1, the hybrid vehicle 20 of this embodiment includes an engine 22, a planetary gear unit 30, motors MG1, MG2, inverters 41, 42, a battery 50, and an electronic control unit for hybrid vehicle (which will be called "HVECU") 70.

The engine 22 is configured as an internal combustion engine that delivers power, using gasoline or light oil as fuel. The operation of the engine 22 is controlled by an electronic control unit for engine (which will be called "engine ECU") 24.

Although not illustrated in the drawings, the engine ECU 24 is configured as a microprocessor having CPU as a central component, and includes ROM that stores processing programs, RAM that temporarily stores data, input/output ports, and communication ports, in addition to the CPU. The engine ECU 24 receives, via input ports, signals from various sensors necessary to control operation of the engine 22, for example, a crank angle θcr from a crank position sensor 23 that detects the rotational position of a crankshaft 26. Also, the engine ECU 24 outputs, via output ports, various control signals for controlling operation of the engine 22, for example, a drive signal to each fuel injection valve, a drive signal to a throttle motor that adjusts the position of a throttle valve, and a control signal to an ignition coil as an integral part of each ignitor. The engine ECU 24, which is connected to the HVECU 70 via a communication port, controls operation of the engine 22 according to a control signal from the HVECU 70, and outputs data concerning operating conditions of the engine 22 to the HVECU 70 as needed. The engine ECU 24 calculates the rotational speed of the crankshaft 26, i.e., the rotational speed Ne of the engine 22, based on the crank angle θcr detected by the crank position sensor 23.

The planetary gear unit 30 is configured as a single pinion type planetary gear mechanism. A rotor of the motor MG1, a drive shaft 36 coupled to drive wheels 38a, 38b via a differential gear 37, and the crankshaft 26 of the engine 22 are connected to a sun gear, a ring gear, and a carrier of the planetary gear unit 30, respectively.

The motor MG1 is configured as a synchronous generator-motor, for example, and its rotor is connected to the sun gear of the planetary gear unit 30. The motor MG2 is configured as a synchronous generator-motor, for example, and its rotor is connected to the drive shaft 36. The motors MG1, MG2 are rotated and driven when an electronic control unit for motor (which will be called "motor ECU") 40 performs switching control on switching devices (not shown) of the inverters 41, 42.

Although not illustrated in the drawings, the motor ECU 40 is configured as a microprocessor having CPU as a central component, and includes ROM that stores processing programs, RAM that temporarily stores data, input/output ports, and communication ports, in addition to the CPU. The motor ECU 40 receives, via input ports, signals from various sensors necessary to perform drive control on the motors MG1, MG2, for example, the rotational positions θm1, θm2 from rotational position detection sensors 43, 44 that detect the rotational positions of the rotors of the motors MG1, MG2, respectively, and phase current from a current sensor that detects current flowing through each phase of the motors MG1, MG2. The motor ECU 40 outputs switching control signals to switching devices (not shown) of the inverters 41, 42, and so forth, via output ports. The motor ECU 40, which is connected to the HVECU 70 via a communication port, performs drive control on the motors MG1, MG2 according to a control signal from the HVECU 70, and outputs data concerning driving conditions of the motors MG1, MG2 to the HVECU 70 as needed. The motor ECU 40 calculates the rotational speeds Nm1, Nm2 of the motors MG1, MG2, based on the rotational positions θm1, θm2 of the rotors of the motors MG1, MG2 detected by the rotational position detection sensors 43, 44.

The battery 50 is in the form of a lithium-ion secondary battery or a nickel hydride battery, for example, and supplies and receives electric power to and from the motors MG1, MG2 via the inverters 41, 42. The battery 50 is managed by an electronic control unit for battery (which will be called "battery ECU") 52.

Although not illustrated in the drawings, the battery ECU 52 is configured as a microprocessor having CPU as a central component, and includes ROM that stores processing programs, RAM that temporarily stores data, input/output ports, and communication ports, in addition to the CPU. The battery ECU 52 receives, via input ports, signals necessary to manage the battery 40, for example, battery voltage Vb from a voltage sensor 51a installed between terminals of the battery 50, battery current Ib from a current sensor 51b mounted at an output terminal of the battery 50, and a battery temperature Tb from a temperature sensor 51c mounted in the battery 50. Also, the battery ECU 52 is connected to the HVECU 70 via a communication port, and outputs data concerning conditions of the battery 50 to the HVECU 70 as needed. In order to manage the battery 50, the battery ECU 52 calculates the power storage ratio SOC as the ratio of the capacity of electric power that can be discharged from the battery 50 at this time to the total capacity, based on the integrated value of the battery current Ib detected by the current sensor 51b. The battery ECU 52 also calculates the input and output limits Win, Wout as the maximum permissible electric power that can be charged into and discharged from the battery 50, based on the calculated power storage ratio SOC, and the battery temperature Tb detected by the temperature sensor 51c.

Although not illustrated in the drawings, the HVECU 70 is configured as a microprocessor having CPU as a central component, and includes ROM that stores processing programs, RAM that temporarily stores data, input/output ports, and communication ports, in addition to the CPU. The HVECU 70 receives, via input ports, an ignition signal from an ignition switch 80, a shift position SP from a shift position sensor 82 that detects the operation position of a shift lever 81, an accelerator operation amount Acc from an accelerator pedal position sensor 84 that detects the amount of depression of an accelerator pedal 83, a brake pedal position BP from a brake pedal position sensor 86 that detects the amount of depression of a brake pedal 85, a vehicle speed V from a vehicle speed sensor 88, and so forth. As described above, the HVECU 70 is connected with the engine ECU 24, motor ECU 40, and the battery ECU 52, via communication ports, and supplies and receives various control signals and data to and from the engine ECU 24, motor ECU 40, and the battery ECU 52.

The hybrid vehicle 20 constructed as described above runs in a hybrid running mode (HV running mode) in which it runs with the engine 22 being operated, or an electric running mode (EV running mode) in which it runs while operation of the engine 22 is stopped.

During running in the HV running mode, the HVECU 70 initially sets required torque Tr* (to be delivered to the drive shaft 36) which is required for running the vehicle, based on the accelerator operation amount Acc from the accelerator pedal position sensor 84 and the vehicle speed V from the vehicle speed sensor 88. Then, running power Pdrv* required for running the vehicle is calculated by multiplying the set required torque Tr* by the rotational speed Nr of the drive shaft 36. Here, the rotational speed Nr of the drive shaft 36 may be obtained by multiplying the rotational speed Nm2 of the motor MG2 or the vehicle speed V by a conversion factor. Then, required power Pe* (to be delivered from the engine 22) required of the vehicle is set by subtracting charge/discharge required power Pb* (having a positive value when power is discharged from the battery 50) of the battery 50 from the calculated running power Pdrv*. Then, the target rotational speed Ne* and target torque Te* of the engine 22 and torque commands Tm1*, Tm2* of the motors MG1, MG2 are set, so that the required power Pe* is delivered from the engine 22, and the required torque Tr* is delivered to the drive shaft 36 within the range of the input and output limits Win, Wout of the battery 50. Then, the target rotational speed Ne* and target torque Te* of the engine 22 are transmitted to the engine ECU 24, and the torque commands Tm1*, Tm2* of the motors MG1, MG2 are transmitted to the motor ECU 40. The engine 22 that has received the target rotational speed Ne* and target torque Te* of the engine 22 performs intake air amount control, fuel injection control, ignition control, etc. on the engine 22, so that the engine 22 is operated based on the target rotational speed Ne* and the target torque Te*. Also, the motor ECU 40 that has received the torque commands Tm1*, Tm2* of the motors MG1, MG2 performs switching control on the switching devices of the inverters 41, 42, so that the motors MG1, MG2 are driven according to the torque commands Tm1*, Tm2*. During running in the HV running mode, when a condition for stopping the engine 22 is satisfied, such as when the required power Pe* reaches a value equal to or smaller than a threshold value Pstop for stopping, the operation of the engine 22 is stopped, and the running mode of the hybrid vehicle 20 is switched to the EV running mode.

During running in the EV running mode, the HVECU 70 initially sets the required torque Tr*, based on the accelerator operation amount Acc from the accelerator pedal position sensor 84 and the vehicle speed V from the vehicle speed sensor 88. Then, the torque command Tm1* of the motor MG1 is set to value 0, and the torque command Tm2* of the motor MG2 is set so that the required torque Tr* is delivered to the drive shaft 36 within the range of the input and output limits Win, Wout of the battery 50. Then, the torque commands Tm1*, Tm2* of the motors MG1, MG2 are transmitted to the motor ECU 40. The motor ECU 40 that has received the torque commands Tm1*, Tm2* of the motors MG1, MG2 performs switching control on the switching devices of the inverters 41, 42, so as to drive the motors MG1, MG2 according to the torque commands Tm1*, Tm2*. During running in the EV running mode, when a condition for starting the engine 22 that the required power Pe* calculated in the same manner as that during running in the HV running mode is larger than the threshold value Pstop for running is satisfied, the engine 22 is started, the running mode of the hybrid vehicle 20 is switched to the HV running mode.

Then, the operation of the hybrid vehicle 20 of this embodiment constructed as described above, in particular, operation performed at a specified time when an abnormality arises in communications between the HVECU 70 and the motor ECU 40 during running in the HV running mode (i.e., during operation of the engine 22), will be described. The HVECU 70 determines that there is an abnormality in communications between the HVECU 70 and the motor ECU 40, when communication from the motor ECU 40 is interrupted over a given period of time (e.g., several seconds), for example. Also, the motor ECU 40 determines that there is an abnormality in communications between the motor ECU 40 and the HVECU 70, when communication from the HVECU 70 is interrupted over a given period of time (e.g., several seconds), for example.

Figure 2:
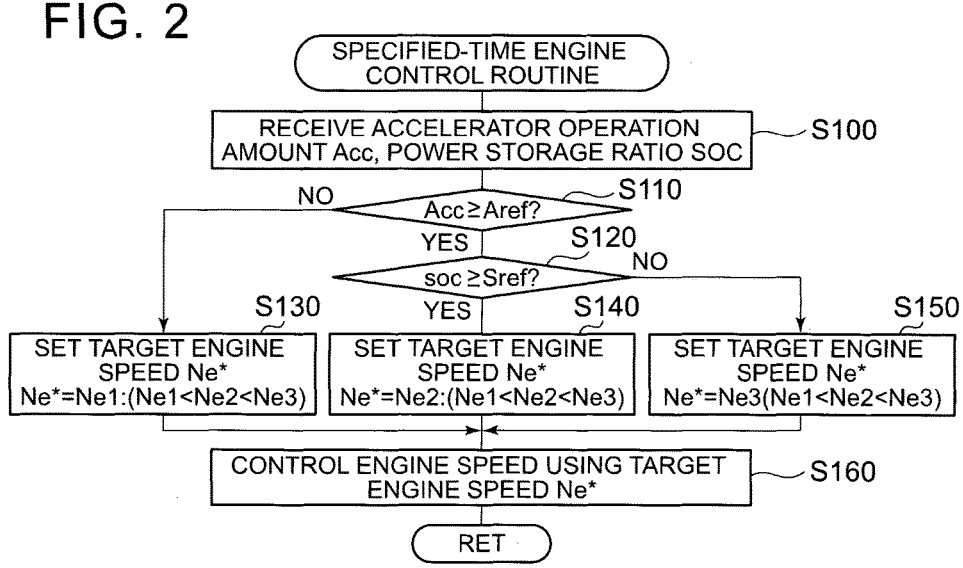
FIG. 2 is a flowchart illustrating one example of a specified-time engine control routine executed by an engine ECU installed on the automobile of the embodiment of FIG. 1.
Figure 3:
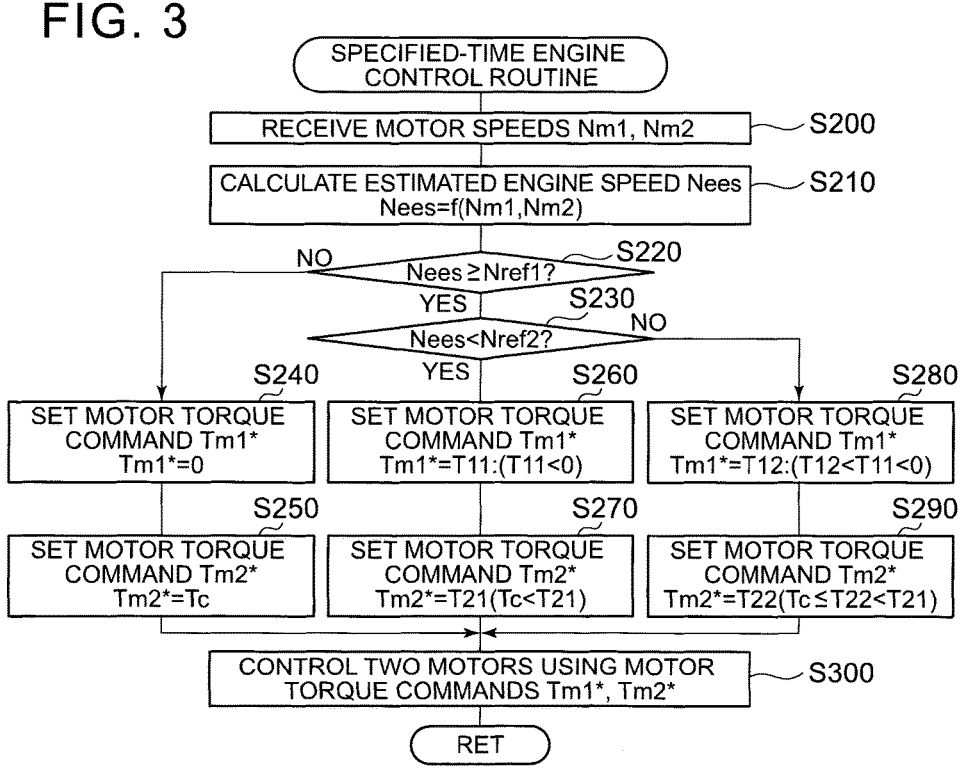
FIG. 3 is a flowchart illustrating one example of a specified-time motor control routine executed by a motor ECU installed on the automobile of the embodiment of FIG. 1.

FIG. 2 is a flowchart illustrating one example of a specified-time engine control routine executed by the engine ECU 24 of this embodiment, and FIG. 3 is a flowchart illustrating one example of a specified-time motor control routine executed by the motor ECU 40 of this embodiment. The specified-time engine control routine of FIG. 2 is repeatedly executed when the engine ECU 24 receives a rotational speed control command from the HVECU 70. The HVECU 70 transmits the rotational speed control command to the engine ECU 24 when it determines that there is an abnormality in communications between the HVECU 70 and the motor ECU 40. The specified-time motor control routine of FIG. 3 is repeatedly executed when the motor ECU 40 determines that there is an abnormality in communications between the motor ECU 40 and the HVECU 70. In the following, the specified-time engine control routine of FIG. 2, and the specified-time motor control routine of FIG. 3 will be successively described.

Once the specified-time engine control routine of FIG. 2 is executed, the engine ECU 24 initially receives the accelerator operation amount Acc and the power storage ratio SOC of the battery 50 (step S100). The engine ECU 24 receives, by communications, a value detected by the accelerator pedal position sensor 84 as the accelerator operation amount Acc, via the HVECU 70. Also, the engine ECU 24 receives, by communications, a value calculated based on the integrated value of the battery current Ib detected by the current sensor 51b as the power storage ratio SOC of the battery 50, from the battery ECU 52.

Once the accelerator operation amount Acc is received in the above manner, the accelerator operation amount Acc thus received is compared with a threshold value Aref (step S110). If the accelerator operation amount Acc is equal to or larger than the threshold value Aref, the power storage ratio SOC of the battery 50 is compared with a threshold value Sref (step S120). The threshold value Aref is used for determining whether the accelerator pedal 83 is depressed to some extent, and may be set to 20% or 30%, for example. The threshold value Sref is used for determining whether the power storage ratio SOC of the battery 50 is relatively low, and may be set to 30% or 40%, for example.

If the accelerator operation amount Acc is smaller than the threshold value Aref, the target rotational speed Ne* of the engine 22 is set to a given rotational speed Ne1 (step S130). If the accelerator operation amount Acc is equal to or larger than the threshold value Aref, and the power storage ratio SOC of the battery 50 is equal to or larger than the threshold value Sref, the target rotational speed Ne* of the engine 22 is set to a given rotational speed Ne2 that is higher than the given rotational speed Ne1 (step S140). If the accelerator operation amount Acc is equal to or larger than the threshold value Aref, and the power storage ratio SOC of the battery 50 is smaller than the threshold value Sref, the target rotational speed Ne* of the engine 22 is set to a given rotational speed Ne3* that is higher than the given rotational speed Ne2 (step S150). Once the target rotational speed Ne* of the engine 22 is set in this manner, rotational speed control (autonomous control) for controlling the engine 22 so as to rotate the engine 22 at the thus set target rotational speed Ne* is performed (step S160), and the routine of FIG. 2 ends. Here, the given rotational speed Ne1 may be set to 900 rpm, or 1000 rpm, or 1100 rpm, for example. Also, the given rotational speed Ne2 may be set to 1900 rpm, or 2000 rpm, or 2100 rpm, for example. Further, the given rotational speed Ne3 may be set to 2900 rpm, or 3000 rpm, or 3100 rpm, for example. The reason why the target rotational speed Ne* of the engine 22 is changed, depending on whether the accelerator operation amount Acc is equal to or larger than the threshold value Aref, or smaller than the threshold value Aref, and whether the power storage ratio SOC of the battery 50 is equal to or larger than the threshold value Sref, or smaller than the threshold value Sref, when the accelerator operation amount Acc is equal to or larger than the threshold value Aref, will be described later.

Next, the specified-time motor control routine of FIG. 3 will be described. Once the specified-time motor control routine of FIG. 3 is executed, the motor ECU 40 initially receives the rotational speeds Nm1, Nm2 of the motors MG1, MG2 (step S200). In this step, the motor ECU 40 receives values calculated based on the rotational positions θm1, θm2 of the rotors of the motors MG1, MG2 detected by the rotational position detection sensors 43, 44, as the rotational speeds Nm1, Nm2 of the motors MG1, MG2, Once the motor ECU 40 receives the rotational speeds Nm1, Nm2 of the motors MG1, MG2, it calculates the estimated rotational speed Nees of the engine 22 based on the received rotational speeds Nm1, Nm2 of the motors MG1, MG2, using Eq. (1) as follows (step S210).

$$Nees = Nm1 \cdot \rho/(1+\rho) + Nm2/(1+\rho) \quad (1)$$

Then, the estimated rotational speed Nees of the engine 22 thus calculated is compared with a threshold value Nref1 (step S220). If the estimated rotational speed Nees is equal to or higher than the threshold value Nref1, the estimated rotational speed Nees is compared with a threshold value Nref2 that is larger than the threshold value Nref1 (step S230). The threshold value Nref1 is used for determining whether the accelerator operation amount Acc is equal to or larger than the threshold value Aref, and may be set to a value, such as 1400 rpm, 1500 rpm, or 1600 rpm, between the given rotational speed Ne1 and the given rotational speed Ne2. Also, the threshold value Nref2 is used for determining whether the power storage ratio SOC of the battery 50 is equal to or larger than the threshold value Sref, or smaller than the threshold value Sref, when the accelerator operation amount Acc is equal to or larger than the threshold value Aref, and may be set to a value, such as 2400 rpm, 2500 rpm, or 2600 rpm, between the given rotational speed Ne2 and the given rotational speed Ne3. Accordingly, when the estimated rotational speed Nees of the engine 22 is lower than the threshold value Nref1, it can be determined that the accelerator operation amount Acc is smaller than the threshold value Aref. When the estimated rotational speed Nees of the engine 22 is equal to or higher than the threshold value Nref1 and lower than the threshold value Nref2, it can be determined that the accelerator operation amount Acc is equal to or larger than the threshold value Aref, and the power storage ratio SOC of the battery 50 is equal to or larger than the threshold value Sref. When the estimated rotational speed Nees of the engine 22 is equal to or higher than the threshold value Nref2, it can be determined that the accelerator operation amount Acc is equal to or larger than the threshold value Aref, and the power storage ratio SOC of the battery 50 is smaller than the threshold value Sref.

Suppose the specified time when an abnormality arises in communications between the HVECU 70 and the motor ECU 40. At this time, the motor ECU 40 cannot grasp the accelerator operation amount Acc and the power storage ratio SOC of the battery 50. In view of this situation, in this embodiment, the engine ECU 24 switches or changes the target rotational speed Ne* of the engine 22, depending on whether the accelerator operation amount Acc is equal to or larger than the threshold value Aref, or smaller than the threshold value Aref, and whether the power storage ratio SOC of the battery 50 is equal to or larger than the threshold value Sref, or smaller than the threshold value Sref, when the accelerator operation amount Acc is equal to or larger than the threshold value Aref. The motor ECU 40 grasps (determines) whether the accelerator operation amount Acc is equal to or larger than the threshold value Aref, or smaller than the threshold value Aref, and whether the power storage ratio SOC of the battery 50 is equal to or larger than the threshold value Sref, or smaller than the threshold value Sref, when the accelerator operation amount Acc is equal to or larger than the threshold value Aref, using the estimated rotational speed Nees of the engine 22. By using this method, it is unnecessary to additionally provide wiring so that the value detected by the accelerator pedal position sensor 84 is transmitted to the motor ECU 40 as well as the HVECU 70, and additionally provide wiring that allows communication to be performed between the battery ECU 52 and the motor ECU 40. Namely, the motor ECU 40 can determine whether the accelerator operation amount Acc is equal to or larger than the threshold value Aref, or smaller than the threshold value Aref, and whether the power storage ratio SOC of the battery 50 is equal to or larger than the threshold value Sref, or smaller than the threshold value Sref, when the accelerator operation amount Acc is equal to or larger than the threshold value Aref, by a simple method, without making design changes in hard configuration.

The target rotational speed Ne* (the given rotational speed Ne2 or given rotational speed Ne3) of the engine 22 established when the accelerator operation amount Acc is equal to or larger than the threshold value Aref is made higher than the target rotational speed Ne* (the given rotational speed Ne1) of the engine 22 established when the accelerator operation amount Acc is smaller than the threshold value Aref, so that the driver is less likely or unlikely to feel strange or uncomfortable, as compared with the case where the given rotational speed Ne2 or given rotational speed Ne3 is made lower than the given rotational speed Ne1. Also, when the accelerator operation amount Acc is equal to or larger than the threshold value Aref, the target rotational speed Ne* (the given rotational speed Ne3) of the engine 22 established when the power storage ratio SOC of the battery 50 is smaller than the threshold value Sref is made larger than the target rotational speed Ne* (the given rotational speed Ne2) of the engine 22 established when the power storage ratio SOC of the battery 50 is equal to or larger than the threshold value Sref. As a result, when torque (torque for generating electric power) is delivered from the motor MG1 in such a direction as to hold down the rotational speed Ne of the engine 22, electric power generated by the motor MG1 can be made larger, and the power storage ratio SOC of the battery 50 can be made less likely or unlikely to be reduced, as compared with the case where the given rotational speed Ne3 is made lower than the given rotational speed Ne2.

Figure 4:
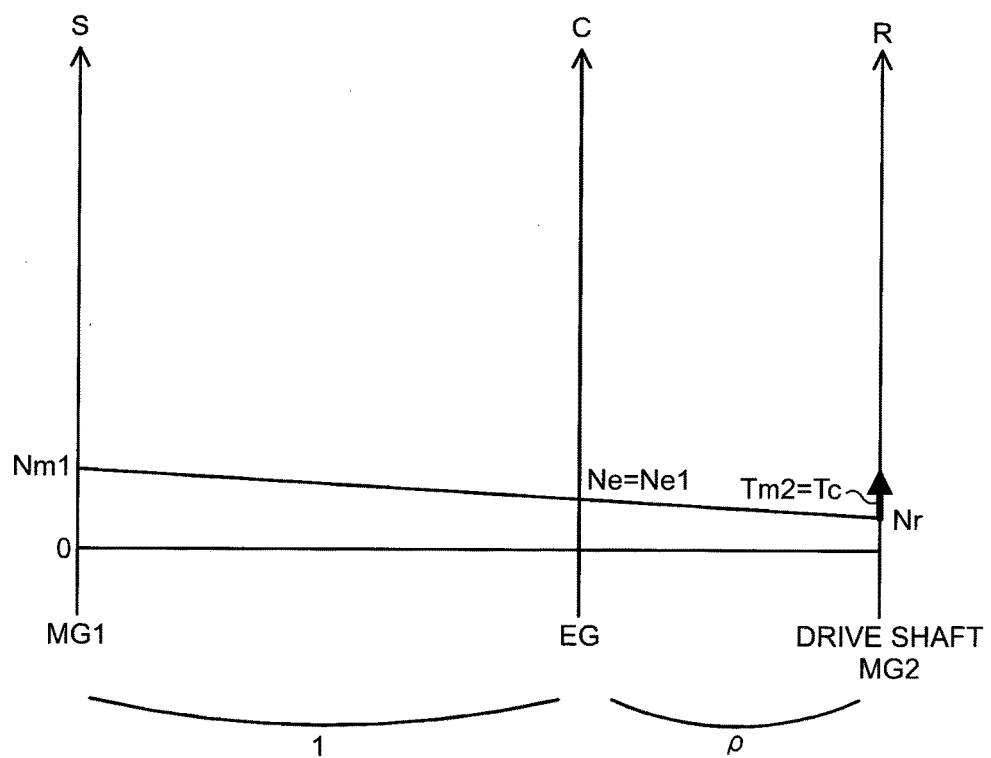
FIG. 4 is an explanatory view showing one example of a nomographic chart indicating the dynamic relationship between the rotational speeds and torque in rotating elements of a planetary gear unit when the accelerator operation amount is smaller than a threshold value at a specified time, in the planetary gear unit installed on the automobile of the embodiment of FIG. 1.

When it is determined in step S220 that the estimated rotational speed Nees of the engine 22 is lower than the threshold value Nref1, it is determined that the accelerator operation amount Acc is smaller than the threshold value Aref, and the torque command Tm1* of the motor MG1 is set to value 0 (step S240), while the torque command Tm2* of the motor MG2 is set to a positive creep torque Tc (step S250). In this case, switching control is performed on the switching devices of the inverters 41, 42 so that the motors MG1, MG2 are driven according to the set torque commands Tm1*, Tm2* (step S300), and the routine of FIG. 3 ends. FIG. 4 is an explanatory view showing one example of a nomographic chart indicating the dynamic relationship between the rotational speeds and torque in rotating elements of the planetary gear unit 30. In FIG. 4, S-axis on the left-hand side indicates the rotational speed of the sun gear as the rotational speed Nm1 of the motor MG1, and C-axis indicates the rotational speed of the carrier as the rotational speed Ne of the engine 22, while R-axis indicates the rotational speed Nr of the ring gear (drive shaft 36) as the rotational speed Nm2 of the motor MG2. Also, in FIG. 4, the thick arrow on the R-axis indicates torque delivered from the motor MG2 and applied to the drive shaft 36. With this control, when there is an abnormality in communications between the HVECU 70 and the motor ECU 40, the hybrid vehicle 20 is allowed to run in a limp-home mode, with the creep torque Tc delivered from the motor MG2.

Figure 5:
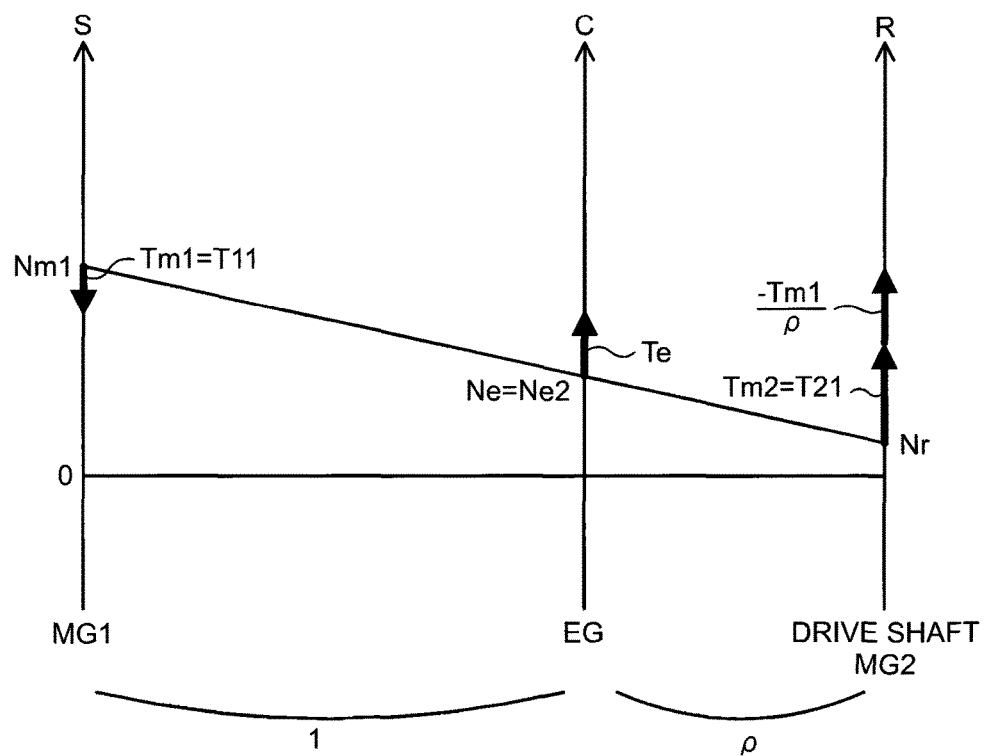
FIG. 5 is an explanatory view showing one example of a nomographic chart indicating the dynamic relationship between the rotational speeds and torque in the rotating elements of the planetary gear unit when the accelerator operation amount is equal to or larger than the threshold value at the specified time, and the power storage ratio of a battery is equal to or larger than a threshold value, in the planetary gear unit.

When it is determined in steps S220, S230 that the estimated rotational speed Nees of the engine 22 is equal to or higher than the threshold value Nref1 and lower than the threshold value Nref2, it is determined that the accelerator operation amount Acc is equal to or larger than the threshold value Aref, and the power storage ratio SOC of the battery 50 is equal to or larger than the threshold value Sref. In this case, the torque command Tm1* of the motor MG1 is set to a negative given torque T11 (step S260), and the torque command Tm2* of the motor MG2 is set to a positive given torque T21 that is larger than the creep torque Tc (step S270). Then, switching control is performed on the switching devices of the inverters 41, 42 (step S300) so that the motors MG1, MG2 are driven according to the set torque commands Tm1*, Tm2*, and the routine of FIG. 3 ends. Here, the given torque T11 may be set to −10 Nm or −15 Nm, for example. Also, the given torque T21 may be set to 30 Nm or 35 Nm, for example. FIG. 5 is an explanatory view showing one example of a nomographic chart indicating the dynamic relationship between the rotational speeds and torque in the rotating elements of the planetary gear unit 30. In FIG. 5, two thick arrows on the R-axis indicate torque delivered from the motor MG1 and applied to the drive shaft 36 via the planetary gear unit 30, and torque delivered from the motor MG2 and applied to the drive shaft 36. In this case, since the given torque T21 is delivered from the motor MG1 in such a direction as to hold down the rotational speed Ne of the engine 22, the engine 22 is operated so as to rotate at the given rotational speed Ne2 while delivering torque according to the given torque T21 and the gear ratio ρ of the planetary gear unit 30. With this control, when there is an abnormality in communications between the HVECU 70 and the motor ECU 40, and the accelerator operation amount Acc is equal to or larger than the threshold value Aref, while the power storage ratio SOC of the battery 50 is equal to or larger than the threshold value Sref, the hybrid vehicle 20 is able to run while delivering torque that is larger than that in the case where the accelerator operation amount Acc is smaller than the threshold value Aref, to the drive shaft 36.

Figure 6:
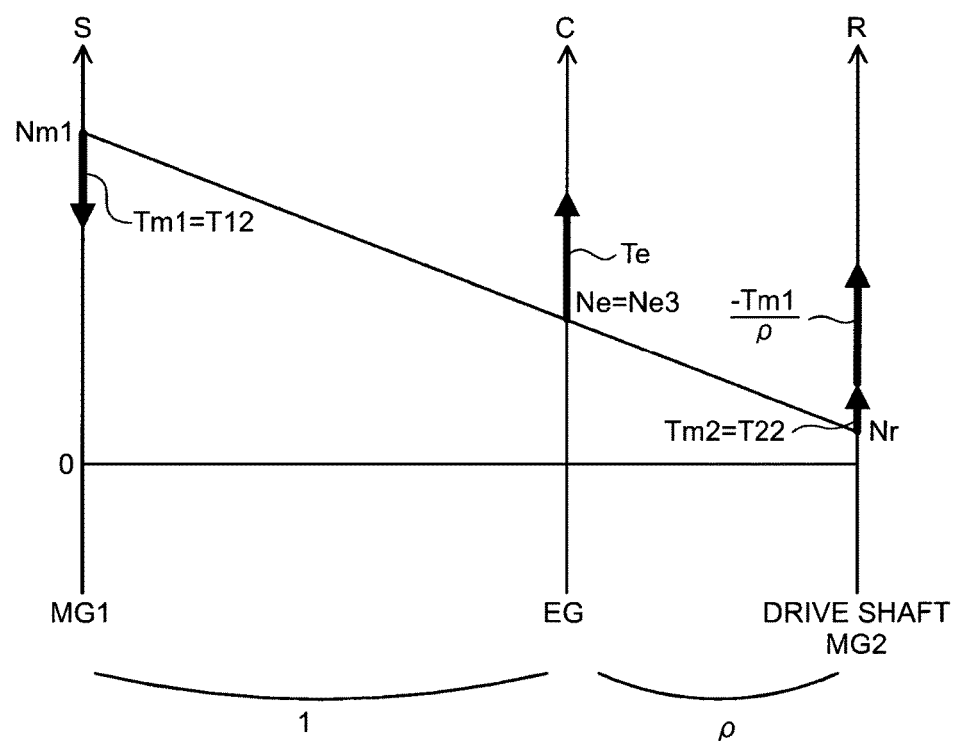
FIG. 6 is an explanatory view showing one example of a nomographic chart indicating the dynamic relationship between the rotational speeds and torque in the rotating elements of the planetary gear unit when the accelerator operation amount is equal to or larger than the threshold value at the specified time, and the power storage ratio of the battery is smaller than the threshold value, in the planetary gear unit.

When it is determined in steps S220, S230 that the estimated rotational speed Nees of the engine 22 is equal to or higher than the threshold value Nref2, it is determined that the accelerator operation amount Acc is equal to or larger than the threshold value Aref, and the power storage ratio SOC of the battery 50 is smaller than the threshold value Sref, and the torque command Tm1* of the motor MG1 is set to a given negative torque T12 that is smaller than the given torque T11 (the absolute value of the given torque T12 is larger than that of the given torque T11) (step S280), while the torque command Tm2* of the motor MG2 is set to a given positive torque T22 that is equal to or larger than the creep torque Tc and smaller than the given torque T21 (step S290). Then, switching control is performed on the switching devices of the inverters 41, 42 (step S300) so that the motors MG1, MG2 are driven according to the set torque commands Tm1*, Tm2*, and the routine of FIG. 3 ends. Here, the given torque T12 and the given torque T22 may be set to values that are determined so that torque equivalent to torque produced when the accelerator operation amount Acc is equal to or larger than the threshold value Aref and the power storage ratio SOC of the battery 50 is equal to or larger than the threshold value Sref is delivered to the drive shaft 36, namely, values determined so that "−T11/ρ+T21=−T12/ρ+T22" is satisfied. FIG. 6 is an explanatory view showing one example of a nomographic chart indicating the dynamic relationship between the rotational speeds and torque in the rotating elements of the planetary gear unit 30. In this case, since the given torque T22 is delivered from the motor MG1 in such a direction as to hold down the rotational speed Ne of the engine 22, the engine 22 is operated so as to rotate at the given rotational speed Ne3 while delivering torque corresponding to the given torque T22. With this control, when there is an abnormality in communications between the HVECU 70 and the motor ECU 40, and the accelerator operation amount Acc is equal to or larger than the threshold value Aref, while the power storage ratio SOC of the battery 50 is smaller than the threshold value Sref, the hybrid vehicle 20 is able to run while delivering torque that is larger than that in the case where the accelerator operation amount Acc is smaller than the threshold value Aref, to the drive shaft 36. Also, electric power generated by the motor MG1 can be increased, and electric power consumed by the motor MG2 can be reduced, as compared with the case where the accelerator operation amount Acc is equal to or larger than the threshold value Aref, and the power storage ratio SOC of the battery 50 is equal to or larger than the threshold value Sref. Therefore, the power storage ratio SOC of the battery 50 is less likely or unlikely to be reduced, and the distance the hybrid vehicle 20 is able to travel can be increased.

In the hybrid vehicle 20 of this embodiment as described above, when there is an abnormality in communications between the motor ECU 40 and the HVECU 70, the motor ECU 40 controls the motor MG2 so that the creep torque Tc, or given torque T21, or given torque 22, is delivered from the motor MG2. Thus, when there is an abnormality in communications between the HVECU 70 and the motor ECU 40, it is possible to deliver torque from the motor MG2 and run the vehicle 20 in a limp home mode, without performing gate blocking in the inverters 41, 42.

When there is an abnormality in communications between the motor ECU 40 and the HVECU 70, the motor ECU 40 controls the motor MG2 so that the creep torque Tc is delivered from the motor MG2, when the accelerator operation amount Acc is smaller than the threshold value Aref (when the estimated rotational speed Nees of the engine 22 is lower than the threshold value Nref1), and controls the motors MG1, MG2 so that the given negative torque T11 or given negative torque T12 is delivered from the motor MG1, and the given positive torque T21 or given positive torque T22 is delivered from the motor MG2, when the accelerator operation amount Acc is equal to or larger than the threshold value Aref (when the estimated rotational speed Nees of the engine 22 is equal to or higher than the threshold value Nref1). Thus, torque determined depending on whether the accelerator operation amount Acc is equal to or larger than the threshold value Aref, or smaller than the threshold value Aref, is delivered to the drive shaft 36, so that the hybrid vehicle 20 is able to run in a limp home mode. Namely, the running capability or performance in the limp home mode can be improved.

Further, when there is an abnormality in communications between the motor ECU 40 and the HVECU 70, and the accelerator operation amount Acc is equal to or larger than the threshold value Aref (when the estimated rotational speed Nees of the engine 22 is equal to or higher than the threshold value Nref1), while the power storage ratio SOC of the battery 50 is smaller than the threshold value Sref (when the estimated rotational speed Nees of the engine 22 is equal to or higher than the threshold value Nref2), the motor ECU 40 controls the motors MG1, MG2 so that electric power generated by the motor MG1 is increased, and electric power consumed by the motor MG2 is reduced, as compared with the time when the power storage ratio SOC of the battery 50 is equal to or larger than the threshold value Sref (when the estimated rotational speed Nees of the engine 22 is lower than the threshold value Nref2). Thus, the power storage ratio SOC of the battery 50 can be made less likely or unlikely to be reduced, and the distance the vehicle is able to travel can be increased.

In addition, the engine ECU 24 sets the target rotational speed Ne* of the engine 22 according to the accelerator operation amount Acc and the power storage ratio SOC of the battery 50, and controls the engine 22 so as to rotate the engine 22 at the target rotational speed Ne*. The motor ECU 40 grasps (determines) whether the accelerator operation amount Acc is equal to or larger than the threshold value Aref, or smaller than the threshold value Aref, and whether the power storage ratio SOC of the battery 50 is equal to or larger than the threshold value Sref, or smaller than the threshold value Sref, using the estimated rotational speed Nees of the engine 22 based on the rotational speeds Nm1, Nm2 of the motors MG1, MG2. Thus, it is unnecessary to additionally provide wiring so that the value detected by the accelerator pedal position sensor 84 is transmitted to the motor ECU 40 as well as the HVECU 70, and additionally provide wiring that allows communication to be performed between the battery ECU 52 and the motor ECU 40. Namely, the motor ECU 40 can determine whether the accelerator operation amount Acc is equal to or larger than the threshold value Aref, or smaller than the threshold value Aref, and whether the power storage ratio SOC of the battery 50 is equal to or larger than the threshold value Sref, or smaller than the threshold value Sref when the accelerator operation amount Acc is equal to or larger than the threshold value Aref, by a simple method, without making design changes in hard configuration.

In the hybrid vehicle 20 of this embodiment, when there is an abnormality in communications between the motor ECU 40 and the HVECU 70, and the accelerator operation amount Acc is equal to or larger than the threshold value Aref, the motor ECU 40 sets the torque commands Tm1*, Tm2* of the motors MG1, MG2 to the given torques T11, T21, respectively, when the power storage ratio SOC of the battery 50 is equal to or larger than the threshold value Sref, and sets the torque commands Tm1*, Tm2* to the given torques T12, T22, respectively, when the power storage ratio SOC of the battery 50 is smaller than the threshold value Sref. In contrast, the torque commands Tm1*, Tm2* of the motors MG1, MG2 may be set to the given torques T11, T21, irrespective of the power storage ratio SOC of the battery 50. In this case, when the engine ECU 24 receives the rotational speed control command from the HVECU 70, and the accelerator operation amount Acc is equal to or larger than the threshold value Aref, the engine ECU 24 may control the engine 22 by setting the target rotational speed Ne* of the engine 22 to the given rotational speed Ne2, irrespective of the power storage ratio SOC of the battery 50.

In the hybrid vehicle 20 of this embodiment, when there is an abnormality in communications between the motor ECU 40 and the HVECU 70, the motor ECU 40 sets the torque commands Tm1*, Tm2* of the motors MG1, MG2 according to the accelerator operation amount Acc and the power storage ratio SOC of the battery 50. In contrast, the motor ECU 40 may set the torque command Tm1* of the motor MG1 to value 0, and set the torque command Tm2* of the motor MG2 to creep torque Tc, irrespective of the accelerator operation amount Acc and the power storage ratio SOC of the battery 50. In this case, when the engine ECU 24 receives the rotational speed control command from the HVECU 70, it may control the engine 22 by setting the target rotational speed Ne* of the engine 22 to the given rotational speed Ne1, irrespective of the accelerator operation amount Acc and the power storage ratio SOC of the battery 50.

In the hybrid vehicle 20 of this embodiment, when there is an abnormality in communications between the HVECU 70 an the motor ECU 40, the HVECU 70 sends the rotational speed control command to the engine ECU 24, and the engine ECU 24 controls the engine 22 so as to rotate the engine 22 at the target rotational speed Ne* when it receives the rotational speed control command from the HVECU 70. In contrast, when the HVECU 70 determines that there is an abnormality in communications between the HVECU 70 and the motor ECU 40, it may send an operation stop command to the engine ECU 24, and the engine ECU 24 may stop operation of the engine 22 according to the operation stop command from the HVECU 70. In this case, when the accelerator operation amount Acc is smaller than the threshold value Aref, the motor ECU 40 may set the torque command Tm1* of the motor MG1 to value 0, and set the torque command Tm2* of the motor MG2 to the creep torque Tc. When the accelerator operation amount Acc is equal to or larger than the threshold value Aref, the motor ECU 40 may set the torque command Tm1* of the motor MG1 to value 0, and set the torque command Tm2* of the motor MG2 to the given torque T21. Also, the motor ECU 40 may set the torque command Tm1* of the motor MG1 to value 0, and set the torque command Tm2* of the motor MG2 to the creep torque Tc, irrespective of the accelerator operation amount Acc. In this embodiment, control of the engine 22 and the motors MG1, MG2 at the specified time when an abnormality arises in communications between the HVECU 70 and the motor ECU 40 during running in the HV running mode (during operation of the engine 22) has been described. However, when an abnormality arises in communications between the HVECU 70 and the motor ECU 40 during running in the EV mode (while operation of the engine 22 is stopped), the motors MG1, MG2 may be controlled in substantially the same manner as in the case of this modified example.

In the hybrid vehicle 20 of this embodiment, when there is an abnormality in communications between the motor ECU 40 and the HVECU 70, and the accelerator operation amount Acc is smaller than the threshold value Aref, the motor ECU 40 controls the motor MG2 so that the creep torque Tc is delivered from the motor MG2. However, the motor ECU 40 may control the motor MG2 so that given torque that is somewhat larger than the creep torque Tc is delivered from the motor MG2.

In the hybrid vehicle 20 of this embodiment, when the engine ECU 24 receives the rotational speed control command from the HVECU 70, the engine ECU 24 sets the target rotational speed Ne* of the engine 22 according to the accelerator operation amount Acc and the power storage ratio SOC of the battery 50, and controls the engine 22. Also, the motor ECU 40 grasps (determines) whether the accelerator operation amount Acc is equal to or larger than the threshold value Aref, or smaller than the threshold value Aref, and whether the power storage ratio SOC of the battery 50 is equal to or larger than the threshold value Sref, or smaller than the threshold value Sref when the accelerator operation amount Acc is equal to or larger than the threshold value Aref, using the estimated rotational speed Nees of the engine 22 based on the rotational speeds Nm1, Nm2 of the motors MG1, MG2. In contrast, when the motor ECU 40 directly receives the accelerator operation amount Acc from the accelerator pedal position sensor 84, or the motor ECU 40 receives the accelerator operation amount Acc from the accelerator pedal position sensor 84 via the engine ECU 24 or the battery ECU 52 by communication, the motor ECU 40 may determine whether the accelerator operation amount Acc is equal to or larger than the threshold value Aref, or smaller than the threshold value Aref, using the received accelerator operation amount Acc. Accordingly, the engine ECU 24 need not switch or change the target rotational speed Ne* of the engine 22, depending on whether the accelerator operation amount Acc is equal to or larger than the threshold value Aref, or smaller than the threshold value Aref. Also, when the motor ECU 40 receives the power storage ratio SOC of the battery 50 from the battery ECU 52 by communication, without the HVECU 70, the motor ECU 40 may determine whether the power storage ratio SOC is equal to or larger than the threshold value Sref, or smaller than the threshold value Sref, using the received power storage ratio SOC of the battery 50. Accordingly, the engine ECU 24 need not switch or change the target rotational speed Ne* of the engine 22, depending on whether the power storage ratio SOC of the battery 50 is equal to or larger than the threshold value Sref, or smaller than the threshold value Sref.

While the hybrid vehicle 20 of the embodiment includes the HVECU 70, engine ECU 24, and the battery ECU 52, the HVECU 70 and the engine ECU 24 may be configured as a single electronic control unit, or the HVECU 70 and the battery ECU 52 may be configured as a single electronic control unit, or the HVECU 70, engine ECU 24, and the battery ECU 52 may be configured as a single electronic control unit.

Figure 7:
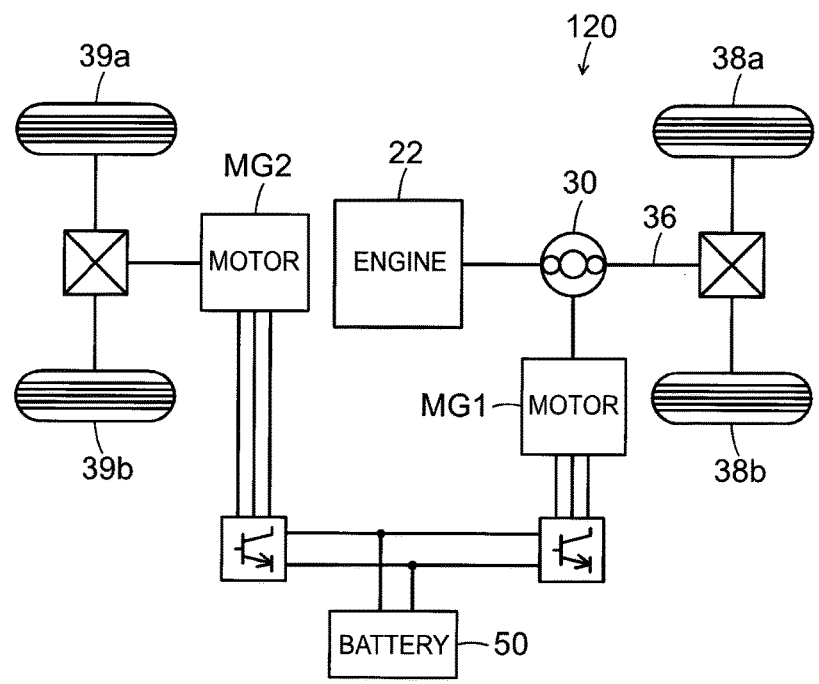
FIG. 7 is a view showing the general configuration of an automobile as a modified example of the embodiment of the invention.

While power from the motor MG2 is delivered to the drive shaft 36 connected to the drive wheels 38a, 38b, in the hybrid vehicle 20 of the embodiment, the power from the motor MG2 may be delivered to an axle (connected to wheels 39a, 39b in FIG. 7) that is different from an axle (connected to the drive wheels 38a, 38b) to which the drive shaft 36 is connected, as illustrated in FIG. 7 showing a hybrid vehicle 120 of a modified example.

Figure 8:
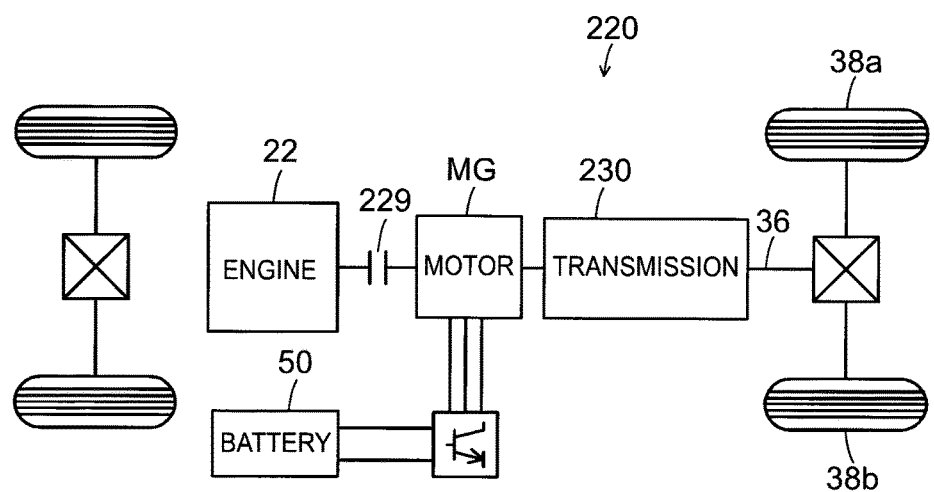
FIG. 8 is a view showing the general configuration of an automobile as another modified example of the embodiment of the invention.

In the hybrid vehicle 20 of the embodiment, power from the engine 22 is delivered, via the planetary gear unit 30, to the drive shaft 36 connected to the drive wheels 38a, 38b, and power from the motor MG2 is delivered to the drive shaft 36. However, as illustrated in FIG. 8 showing a hybrid vehicle 220 of a modified example, a motor MG may be connected, via a transmission 230, to the drive shaft 36 connected to the drive wheels 38a, 38b, and the engine 22 may be connected to a rotary shaft of the motor MG via a clutch 229, so that power from the engine 22 is delivered to the drive shaft 36 via the rotary shaft of the motor MG and the transmission 230, and power from the motor MG is delivered to the drive shaft 36 via the transmission 230. In this case, when there is an abnormality in communications between the HVECU that sets a torque command of the motor MG according to the accelerator operation amount, and the motor ECU that receives the torque command from the HVECU and controls the motor MG so as to drive the motor MG according to the received torque command, the motor ECU may control the motor MG when the accelerator pedal amount is equal to or larger than a threshold value so that torque that is larger than that in the case where the accelerator operation amount is smaller than the threshold value is delivered from the motor MG, or the motor ECU may control the motor MG so that a fixed torque (e.g., creep torque) is delivered from the motor MG, irrespective of the accelerator pedal amount.

In the illustrated embodiment, the hybrid vehicle 20 is of a parallel type, and runs using power from the engine 22 and power from the motor MG2. However, the invention may be applied to other types of vehicles provided that the vehicle includes a motor, a battery, a main controller that sets a torque command of the motor according to the accelerator operation amount, and a motor controller that receives the torque command from the main controller, and controls the motor so as to drive the motor according to the received torque command. For example, the invention may be applied to a hybrid vehicle of a series type, or a simple electric vehicle.

The correspondence relationship between the main elements of the illustrated embodiment and the main elements of the invention described in the above section titled "SUMMARY OF THE INVENTION" will be described. In the illustrated embodiment, the motor MG2 corresponds to "motor", and the battery 50 corresponds to "battery", while the HVECU 70, engine ECU 24, and battery ECU 52 correspond to "main controller", and the motor ECU 40 corresponds to "motor controller".

The correspondence relationship between the main elements of the embodiment and the main elements of the invention described in the "SUMMARY OF THE INVENTION" section is one example for specifically describing a mode for carrying out the invention described in the "SUMMARY OF THE INVENTION" section, and is not intended to limit the elements of the invention described in the "SUMMARY OF THE INVENTION" section. Namely, the invention described in the "SUMMARY OF THE INVENTION" section is to be interpreted based on the description in this section, and the illustrated embodiment is a mere specific example of the invention described in the "SUMMARY OF THE INVENTION" section.

While the mode for carrying out the invention has been described using the embodiment, this invention is by no means limited to this embodiment, but may be embodied in various modes or forms, without departing from the principle of the invention.

The present invention can be utilized in automotive manufacturing industries.

What is claimed is:

1. An automobile comprising:
   a motor configured to run the automobile,
   a battery configured to deliver and receive electric power to and from the motor;
   a main controller configured to set a first torque command of the motor according to an accelerator operation amount of the automobile; and
   a motor controller configured to:
   (i) communicate with the main controller,
   (ii) receive the first torque command from the main controller,
   (iii) control the motor so as to drive the motor according to the first torque command received,
   when there is an abnormality in communications between the motor controller and the main controller, the motor controller being configured to:
   (iv) control the motor so as to drive the motor according to a second torque command, when the accelerator operation amount is smaller than a first threshold value, and
   (v) control the motor so as to drive the motor according to a third torque command that is larger than the second torque command, when the accelerator operation amount is equal to or larger than the first threshold value.

2. The automobile according to claim 1, further comprising:
   an engine;
   a generator configured to (i) deliver and receive power, and (ii) deliver and receive electric power to and from the battery; and
   a planetary gear unit including three rotating elements connected to a rotary shaft of the generator, an output shaft of the engine, and a drive shaft coupled to an axle, the three rotating elements being arranged in the order of the rotary shaft, the output shaft, and the drive shaft in a nomographic chart, wherein
   the motor is configured to deliver and receive power to and from the drive shaft,
   the main controller is configured to:
   (i) set a target operating point of the engine according to the accelerator operation amount,
   (ii) set a fourth torque command of the motor,
   (iii) control the engine so as to operate the engine at the target operating point, and
   (iv) control the engine so as to rotate the engine at a first predetermined rotational speed when there is the abnormality in communications between the main controller and the motor controller, and
   when there is the abnormality in communications between the motor controller and the main controller, the motor controller is configured to:
   (i) control the motor so as to drive the motor according to a fifth torque command when the accelerator operation amount is smaller than a second threshold value, and
   (ii) control the motor so as to drive the motor according to a sixth torque command that is equal to or larger than the fifth torque command and control the generator so as to drive the generator according to a seventh torque command in such a direction as to hold down a rotational speed of the engine, when the accelerator operation amount is equal to or larger than the second threshold value.

3. The automobile according to claim 2, wherein
   when there is the abnormality in communications between the motor controller and the main controller, the motor controller is configured to:
   (i) control the motor so as to drive the motor according to the sixth torque command, when the accelerator operation amount is equal to or larger than the second threshold value, and a power storage ratio of the battery is equal to or larger than a third threshold value,
   (ii) control the generator so as to drive the generator according to the seventh torque command, and
   (iii) control the motor so as to drive the motor according to an eighth torque command that is equal to or larger than the fifth torque command and smaller than the sixth torque command, and control the generator so as to drive the generator according to a ninth torque command that is larger than the seventh torque command in such the direction as to hold down the rotational speed of the engine, when the power storage ratio of the battery is smaller than the third threshold value.

4. The automobile according to claim 3, wherein
   when there is the abnormality in communications between the main controller and the motor controller, the main controller is configured to:
   (i) control the engine so as to rotate the engine at the first predetermined rotational speed when the accelerator operation amount is smaller than the second threshold value, (ii) control the engine so as to rotate the engine at a second predetermined rotational speed that is different from the first predetermined rotational speed, when the accelerator operation amount is equal to or larger than the second threshold value, and the power storage ratio of the battery is equal to or larger than the third threshold value, and (iii) control the engine so as to rotate the engine at a third predetermined rotational speed that is different from the first predetermined rotational speed and the second predetermined rotational speed, when the accelerator operation amount is equal to or larger than the second threshold value, and the power storage ratio of the battery is smaller than the third threshold value, and when there is the abnormality in communications between the motor controller and the main controller, the motor controller is configured to:

(i) calculate an estimated rotational speed of the engine using a rotational speed of the motor and a rotational speed of the generator, and (ii) determine, using the estimated rotational speed, whether the accelerator operation amount is smaller than the second threshold value, and whether the power storage ratio of the battery is equal to or larger than the third threshold value, or smaller than the third threshold value, when the accelerator operation amount is equal to or larger than the second threshold value.

5. The automobile according to claim 2, wherein when there is the abnormality in communications between the main controller and the motor controller, the main controller is configured to:

(i) control the engine so as to rotate the engine at the first predetermined rotational speed, when the accelerator operation amount is smaller than the second threshold value, and (ii) control the engine so as to rotate the engine at a fourth predetermined rotational speed that is different from the first predetermined rotational speed, when the accelerator operation amount is equal to or larger than the second threshold value, and, when there is the abnormality in communications between the motor controller and the main controller, the motor controller is configured to:

(i) calculate an estimated rotational speed of the engine using a rotational speed of the motor and a rotational speed of the generator, and (ii) determine whether the accelerator operation amount is equal to or larger than the second threshold value, or smaller than the second threshold value, using the estimated rotational speed of the engine.

* * * * *